United States Patent
Huhmann et al.

(10) Patent No.: US 6,363,852 B1
(45) Date of Patent: Apr. 2, 2002

(54) FACTORY TESTABLE IGNITER MODULE FOR A VEHICLE SUPPLEMENTAL RESTRAINT SYSTEM

(75) Inventors: Douglas J. Huhmann, Carmel; Mark W. Gose, Kokomo, both of IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/708,105

(22) Filed: Nov. 6, 2000

(51) Int. Cl.[7] .................................................. F42B 3/13
(52) U.S. Cl. ................. 102/202.5; 102/200; 102/202.7; 102/202.9; 102/215; 102/217; 438/14
(58) Field of Search .......................... 438/14; 307/10.1; 361/247; 102/202.5, 215, 217, 202.7, 202.9, 200

(56) References Cited

U.S. PATENT DOCUMENTS

| | | | |
|---|---|---|---|
| 6,133,054 A | * | 10/2000 | Henson |
| 6,166,452 A | * | 12/2000 | Adams et al. |
| 6,194,235 B1 | * | 2/2001 | Ma |
| 6,194,738 B1 | * | 2/2001 | Debenham et al. |
| 6,208,924 B1 | * | 3/2001 | Bauer |
| 6,258,609 B1 | * | 7/2001 | Farnworth |
| 6,265,232 B1 | * | 7/2001 | Simmons |

OTHER PUBLICATIONS

US Patent Application Publication 2001/0026949A1.*

* cited by examiner

*Primary Examiner*—Michael J. Carone
*Assistant Examiner*—Troy Chambers
(74) *Attorney, Agent, or Firm*—Jimmy L. Funke

(57) ABSTRACT

An improved modular igniter package designed for bus communication with a central control module has an internal bridge element that is electrically accessible for factory testing of the bridge element. Temporary electrical interconnects internal to the igniter package electrically couple the bridge element to a pair of external bus communication terminals, enabling direct access to the bridge element by factory test equipment for accurate measurement of electrical parameters such as electrical resistance and thermal capacitance. Following measurement of the electrical parameters, the temporary interconnects are electrically destroyed, isolating the bus communication terminals from the bridge element. The temporary interconnects are preferably in the form of a pair of metal fuse elements, which are electrically destroyed by electrical currents passing through the fuse elements and respective diodes coupling the bridge element to a ground terminal of the igniter package.

8 Claims, 1 Drawing Sheet

FACTORY TESTABLE IGNITER MODULE FOR A VEHICLE SUPPLEMENTAL RESTRAINT SYSTEM

TECHNICAL FIELD

The present invention is directed to an igniter module for a vehicle supplemental restraint system, and more particularly to a igniter module that facilitates factory testing of a bridge element installed in the igniter module.

BACKGROUND OF THE INVENTION

Vehicle supplemental restraint systems nearly always include restraints that are pyrotechnically deployed by supplying electrical current to a bridge element or squib. Obviously, system reliability requires electrical integrity of the bridge element and its connections to an associated deployment circuit, and various on-board diagnostic routines have been developed for periodically checking the bridge integrity by monitoring a bridge voltage developed in response to a small bridge current. However, there is a desire, particularly in the factory environment, to provide direct access to the bridge element of an assembled igniter module to enable more precise and/or extensive measurement of bridge element parameters such as electrical resistance and thermal capacitance. This is particularly difficult to achieve with a modular or integrated igniter that includes deployment circuitry designed for bus communication with a central control module. Direct access to the bridge element could be achieved, of course, by configuring the modular igniter package to include a pair of dedicated test terminals coupled to the internal bridge element, but this would significantly increase the cost of the igniter package. Accordingly, what is needed is a low cost modular igniter package having a mechanism that enables factory measurement of bridge element electrical parameters.

SUMMARY OF THE INVENTION

The present invention is directed to an improved and low cost modular igniter package designed for bus communication with a central control module, and having an internal bridge element that is electrically accessible for factory testing of the bridge element. According to the invention, temporary electrical interconnects internal to the igniter package electrically couple the bridge element to a pair of external bus communication terminals, enabling direct access to the bridge element by factory test equipment for accurate measurement of electrical parameters such as electrical resistance and thermal capacitance. Following measurement of the electrical parameters, the temporary interconnects are electrically destroyed, isolating the bus communication terminals from the bridge element. In a preferred embodiment, the temporary interconnects are formed by a pair of metal fuse elements, which are electrically destroyed by electrical currents passing through the fuse elements and respective diodes coupling the bridge element to a ground terminal of the igniter package.

DESCRIPTION OF THE PREFERRED EMBODIMENT

Figure 1:
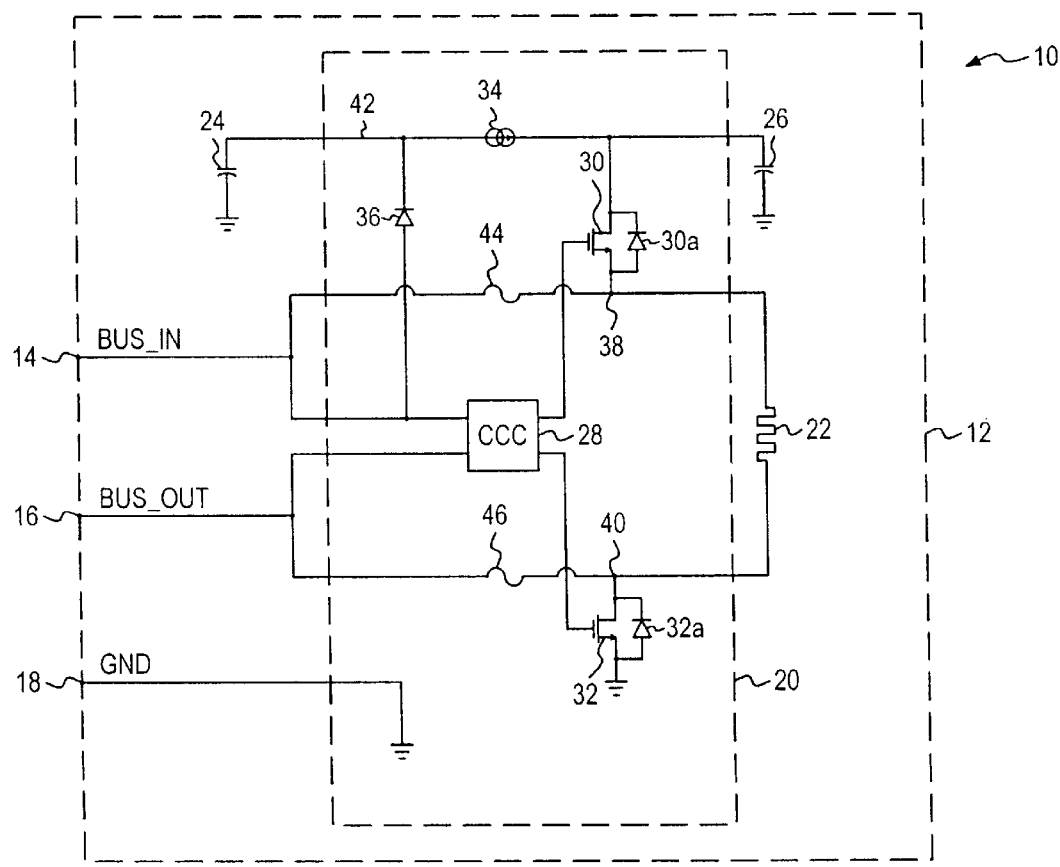
FIG. 1 is a schematic diagram of a modular igniter according to this invention.

Referring to the drawings, and particularly to FIG. 1, the reference numeral 12 designates the package outline of a modular igniter 10 for a motor vehicle supplemental restraint system. The modular igniter 10 is designed for two-wire bus communication, and has three external terminals: BUS_IN terminal 14, BUS_OUT terminal 16 and ground (GND) terminal 18. In practice, a supplemental restraint system includes several such modular igniters 10, one for each supplemental restraint controlled by a central control module (not shown).

In general, the modular igniter 10 includes a deployment circuit 20 (which may be implemented as an application specific integrated circuit), a low energy igniter element 22, a pair of capacitors 24, 26, and a pyrotechnic charge (not shown). In general, the capacitor 24 is provided for maintaining an operating voltage for the deployment circuit 20, and the capacitor 26 is provided for maintaining reserve energy for firing the igniter element 22 when deployment of a respective restraint device is desired. The deployment circuit 20 includes a communication and control circuit (CCC) 28, high-side and low-side MOSFETs 30, 32, a current source 34 and a diode 36. The communication and control circuit 28 is coupled to the BUS_IN and BUS_OUT terminals 14, 16, and individually controls the conduction of MOSFETs 30, 32 in response to deployment control signals received from the central control module. The high-side MOSFET 30 couples capacitor 26 to one terminal 38 of igniter element 22, while the low-side MOSFET 32 couples the other terminal 40 of igniter element 22 to ground. The diodes 30a, 32a coupled across the respective drain-to-source circuits of the MOSFET 30, 32 may be discrete devices, but in the illustrated embodiment are actually body diodes inherent to the respective MOSFETs 30, 32. In operation in a vehicle, the BUS_IN terminal 14 is normally maintained at a high voltage with respect to the igniter module ground (GND), and the diode 36 couples the BUS_IN terminal 14 to line 42 for supplying charging current to capacitor 24 and to capacitor 26 via current source 34.

The present invention specifically concerns the provision of a low cost mechanism for factory testing the igniter element 22 after the modular igniter 10 has been assembled. To this end, the deployment circuit 20 includes a pair of temporary interconnects in the form of metal fuses 44 and 46. The fuse 44 connects BUS_IN terminal 14 to the igniter element terminal 38, while the fuse 46 connects BUS_OUT terminal 16 to the igniter element terminal 40.

Figure 2:
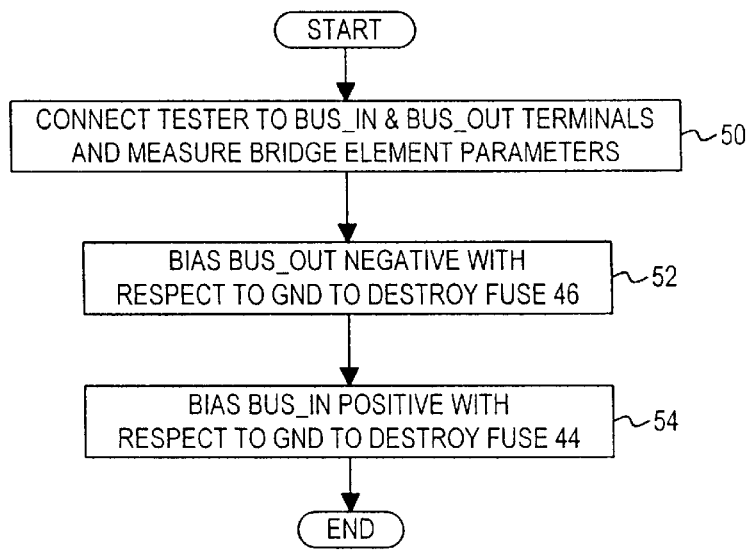
FIG. 2 is a process flow diagram illustrating a test procedure for the modular igniter of FIG. 1.

Factory testing of the igniter element 22 involves three steps identified by the blocks 50, 52 and 54 of FIG. 2: measuring the igniter element parameters, destroying the fuse 44, and destroying the fuse 46. A test instrument may be connected to the BUS_IN and BUS_OUT terminals 14 and 16, placing the instrument in electrical contact with the igniter element 22 via fuses 44, 46 for the purpose of determining various electrical parameters of igniter element 22. These parameters typically include electrical resistance and thermal capacitance, as mentioned above. The fuses 44, 46 will have a much lower electrical resistance than the igniter element 22 so that their resistance will not significantly affect the measured parameters. When the parameters have been measured and deemed acceptable, the test instrument is removed and the fuses 44, 46 are electrically destroyed (open-circuited) to eliminate the respective electrical connections between bus terminals 14, 16 and igniter terminals 38, 40. The fuse 44 is destroyed by biasing BUS_IN terminal 14 to a positive voltage with respect to ground (GND) terminal 18, and limiting the supplied current to a predetermined value sufficient to destroy the fuse 44. The current path in this case includes the fuse 44, the body diode 30a of MOSFET 30, and the capacitor 26 (which is initially uncharged). The fuse 46 is destroyed by biasing BUS_OUT terminal 16 to a negative voltage with respect to ground (GND) terminal 18, and limiting the supplied current to a predetermined value sufficient to destroy the fuse 46. The current path in this case includes the fuse 46 and the body diode 32a of MOSFET 32. In each case, there is no risk of firing the igniter element 22 because the igniter terminal 38, 40 opposite the respective bus terminal 14, 16 is diode-isolated from ground (GND) terminal 18.

In summary, the present invention provides a cost-effective expedient for factory testing of an igniter element assembled into a modular igniter configured for bus communication with a central control module. The fuse elements 44, 46 add very little cost to the deployment circuit 20, and may be quickly and safely eliminated upon completion of the factory testing. While the present invention has been described in reference to the illustrated embodiment, it is expected that various modification in addition to those mentioned above will occur to those skilled in the art. Thus, it will be understood that igniter modules and testing methods incorporating these and other modifications may fall within the scope of this invention, which is defined by the appended claims.

What is claimed is:

1. A restraint system igniter module including a deployment circuit and a bridge element coupled to the deployment circuit, the improvement wherein:

the igniter module has an external ground terminal and first and second external bus communication terminals electrically coupled to said deployment circuit;

the first and second bus communication terminals are electrically coupled to first and second ends of said bridge element via first and second respective temporary electrical interconnects to permit test instrument access to said bridge element via said first and second bus communication terminals and said first and second temporary electrical interconnects; and first and second diodes electrically couple the first and second ends of said bridge element to said ground terminal, permitting post-test destruction of said first and second temporary electrical interconnects via said external ground and bus communication terminals to electrically isolate said external bus communication terminals from said bridge element.

2. The restraint system igniter module of claim 1, wherein:

the deployment circuit includes a first MOSFET device electrically coupling the first end of said bridge element to said ground terminal and a second MOSFET device electrically coupling the second end of said bridge element to said ground terminal via a capacitor; and the first and second diodes are body diodes of said first and second MOSFET devices.

3. The restraint system igniter module of claim 1, wherein said first electrical interconnect is destroyed by an electrical current passing through said first external bus communication terminal, said first electrical interconnect, said first diode and said external ground terminal.

4. The restraint system igniter module of claim 1, wherein said second electrical interconnect is destroyed by an electrical current passing through said second external bus communication terminal, said second electrical interconnect, said second diode and said external ground terminal.

5. A restraint system igniter module comprising:

a deployment circuit, an energy reserve capacitor and a bridge element assembled into a single module having an external ground terminal and first and second external communication terminals electrically coupled to said deployment circuit;

a first conductive fuse element connected between the first external communication terminal a first end of said bridge element to permit initial electrical access to said first end of said bridge element via said first external communication terminal;

a second conductive fuse element connected between the second external communication terminal and a second end of said bridge element to permit initial electrical access to said second end of said bridge element via said second external communication terminal;

a first diode coupling the first end of said bridge element to said ground terminal through said energy reserve capacitor to permit destruction of said first conductive fuse element via an electric current passing through said first external communication terminal, said first conductive fuse element, said first diode, said energy reserve capacitor and said external ground terminal; and, a second diode coupling the second end of said bridge element to said ground terminal to permit destruction of said second conductive fuse element via an electric current passing through said second external communication terminal, said second conductive fuse element, said second diode, and said external ground terminal.

6. The restraint system igniter module of claim 5, wherein:

the deployment circuit includes a first MOSFET device electrically coupling the first end of said bridge element to said external ground terminal and a second MOSFET device electrically coupling the second end of said bridge element to said energy reserve capacitor; and the first and second diodes are body diodes of said first and second MOSFET devices.

7. A restraint system igniter module having a factory testable bridge element, comprising:

a deployment circuit assembled together with said bridge element in a single module having an external ground terminal and first and second external communication terminals electrically coupled to said deployment circuit; and first and second conductive fuse elements electrically coupling the first and second external communication terminals to first and second ends of said bridge element, and first and second diodes electrically coupling the first and second ends of said bridge element to said external ground terminal, thereby enabling a factory to test procedure in which a test instrument accesses said bridge element via said first and second external communication terminals, and external voltages are applied to said external ground and communication terminals to destroy said first and second conductive fuse elements via said first and second diodes.

8. The restraint system igniter module of claim 7, wherein a first external voltage is applied between said external ground terminal and said first external communication terminal to destroy said first conductive fuse element, and a second external voltage is applied between said external ground terminal and said second external communication terminal to destroy said second conductive fuse element.

\* \* \* \* \*